United States Patent [19]

Kioka et al.

[11] Patent Number: 4,742,139
[45] Date of Patent: May 3, 1988

[54] PROCESS FOR PRODUCING OLEFIN POLYMERS OR COPOLYMERS

[75] Inventors: Mamoru Kioka, Ohtake; Norio Kashiwa, Iwakuni, both of Japan

[73] Assignee: Mitsui Petrochemical Industries, Ltd., Tokyo, Japan

[21] Appl. No.: 6,305

[22] Filed: Jan. 15, 1987

Related U.S. Application Data

[63] Continuation of Ser. No. 803,528, Dec. 2, 1985, abandoned, which is a continuation of Ser. No. 698,758, Feb. 7, 1985, abandoned, which is a continuation of Ser. No. 508,420, Jun. 27, 1983, abandoned, which is a continuation of Ser. No. 355,379, Mar. 8, 1982, abandoned, which is a continuation of Ser. No. 168,202, Jul. 10, 1980, abandoned.

[30] Foreign Application Priority Data

Jul. 11, 1979 [JP] Japan ................................. 54-86889

[51] Int. Cl.$^4$ .......................... C08F 4/02; C08F 10/00
[52] U.S. Cl. ..................................... 526/125; 502/119; 502/133; 502/134; 526/124; 526/351
[58] Field of Search ................................. 526/124, 125

[56] References Cited

U.S. PATENT DOCUMENTS

| | | | |
|---|---|---|---|
| 4,071,672 | 1/1978 | Kashiwa | 526/125 |
| 4,076,924 | 2/1978 | Toyota et al. | 526/125 |
| 4,085,276 | 4/1978 | Toyota et al. | 526/125 |
| 4,115,319 | 9/1978 | Scata et al. | 526/125 |
| 4,149,990 | 4/1979 | Giannini et al. | 526/125 |
| 4,168,361 | 9/1979 | Oda et al. | 526/124 |
| 4,330,649 | 5/1982 | Kioka et al. | 526/125 |

*Primary Examiner*—Edward J. Smith
*Attorney, Agent, or Firm*—Sherman and Shalloway

[57] ABSTRACT

In a process for producing olefin polymer or copolymer by using a catalyst composed of (A) a solid titanium catalyst component containing magnesium, titanium, halogen and an electron donor and derived from a magnesium-containing solid carrier obtained by contacting a magnesium compound in the liquid state with a precipitant, and (B) an organometallic compound of a metal selected from the group consisting of metals of Groups I to III of the periodic table; the improvement wherein (I) said catalyst component (A) is a reaction product of
 (iv) a titanium compound in the liquid state and a magnesium-containing solid carrier formed by contacting
 (i) a magnesium compound in the liquid state having no reducing ability and not containing a tetraalkoxy-, tetracycloalkoxy- or tetraaryloxy-titanium compound, said magnesium compound being selected from the specified group, with
 (ii) a precipitant other than a titanium compound, in the presence or absence of (iii) an electron donor having no active hydrogen, and
(II) said reaction product is formed by reacting the titanium compound (iv) in the liquid state and the magnesium-containing solid carrier pre-treated or not-pre-treated with the electron donor (iii) having no active hydrogen in the presence or absence of the electron donor (iii) having no active hydrogen, the electron donor (iii) having no active hydrogen being used at least once in (I) and (II) above.

4 Claims, No Drawings

PROCESS FOR PRODUCING OLEFIN POLYMERS OR COPOLYMERS

This application is a continuation of application Ser. No. 803,528 filed Dec. 2, 1985, now abandoned, which is a continuation of application Ser. No. 698,758 filed Feb. 7, 1985, now abandoned, which is a continuation of application Ser. No. 508,420 filed June 27, 1983, now abandoned which is a continuation of application Ser. No. 355,379 filed Mar. 8, 1982 now abandoned which is a continuation of application Ser. No. 168,202 filed July 10, 1980 now abandoned.

This invention relates to an improved process for producing olefin polymers (sometimes used to denote both homopolymers and copolymers of olefins) by polymerizing (sometimes used to denote homopolymerization and copolymerization) an olefin or olefins with or without a diolefin in the presence of a catalyst composed of (A) a solid titanium catalyst component containing magnesium, titanium, halogen and an electron donor and derived from a magnesium-containing solid carrier obtained by contacting a magnesium compound in the liquid state with a percipitant, and (B) an organometallic compound of a metal selected from the group consisting of metals of Groups I to III of the periodic table.

The process of this invention can be used favorably in polymerizing alpha-olefins having 2 to 8 carbon atoms, and can afford highly stereospecific polymers when applied, for example, to the polymerization of alpha-olefins having at least 3 carbon atoms. Even when the melt index of such a polymer is adjusted to the desired value by using a molecular weight controlling agent such as hydrogen, the stereospecificity of the polymer shows little or no decrease. Furthermore, when the process of this invention is carried out by the slurry polymerization method or gaseous-phase polymerization method, a granular or spherical polymer having good flowability can be produced with excellent catalytic activity and a good reproducibility of quality.

More specifically, this invention pertains, in a process for producing a polymer or copolymer of an olefin, for example an alpha-olefin having 2 to 8 carbon atoms, which comprises polymerizing or copolymerizing the olefin or olefins with up to about 5 mole% of a diolefin in the presence of a catalyst composed of the components (A) and (B) above, to the improvement wherein (I) said catalyst component (A) is a reaction product of (iv) a titanium compound in the liquid state and a magnesium-containing solid carrier formed by contacting (i) a magnesium compound in the liquid state having no reducing ability and not containing a tetraalkoxy-, tetracycloalkoxy- or tetraaryloxy-titanium compound, said magnesium compound being selected from the group consisting of a liquid magnesium compound, a hydrocarbon solvent solution of a magnesium compound and a magnesium compound in the liquid state obtained by contacting a magnesium compound with an electron donor selected from the group consisting of alcohols, organic carboxylic acids, aldehydes, amines and the mixtures thereof, with (ii) a precipitant other than a titanium compound, in the presence or absence of (iii) an electron donor having no active hydrogen, and (II) said reaction product is formed by reacting the titanium compound (iv) in the liquid state and the magnesium-containing solid carrier pre-treated or not pre-treated with the electron donor (iii) having no active hydrogen in the presence or absence of the electron donor (iii) having no active hydrogen, and wherein the electron donor (iii) having no active hydrogen is used at least once in (I) and (II) above.

Numerous suggestions have been known about the polymerization of olefins using a solid titanium catalyst component containing magnesium, titanium, halogen and an electron donor. Polymerization of alpha-olefins having at least 3 carbon atoms using this catalyst component can give highly stereospecific polymers with high catalytic activity.

It has been desired however to improve stereospecificity and catalytic activity, and also to provide polymer particles of such good flowability as to require no pelletization with a good reproducibility of quality. When it is desired to obtain a polymer of a high melt index using a molecular weight controlling agent such as hydrogen, the stereospecificity of the resulting polymer is inevitably reduced. Thus, it has been desired to develop means for advantageously avoiding such a trouble. The solid titanium catalyst component varies greatly in properties depending upon the method of its preparation, and many different suggestions have been made about a combination of starting ingredients, the sequence of reacting these ingredients, means of performing such reactions, etc.

Conventionally, the solid titanium catalyst component has been prepared by reacting a magnesium compound, an electron donor and a titanium compound optionally together with auxiliary agents such as an organoaluminum compound and a silicon compound in different combinations by different means. In most of the prior suggestions, the magnesium compound is used as a solid, and as an exception, Grignard compounds in liquid state which are magnesium compounds having reducing ability are used.

For example, Japanese Laid-Open Patent Publications Nos. 28189/76 (corresponding to U.S. Pat. No. 4,076,924), 92885/76 (corresponding to U.S. Pat. No. 4,085,276), and 21093/78 (corresponding to German Laid-open Patent Publication No. 2,735,672) disclose a solid titanium catalyst component prepared by supporting a titanium compound on a carrier component derived from a magnesium halide, an active hydrogen compound (e.g., an alcohol or an organic acid ester), and an organoaluminum compound, a silicon halide, etc. In the methods specifically disclosed in these prior patent documents, the magnesium halide components to be contacted with an organoaluminum compound or a silicon halide are solid. If a solid magnesium halide component is used, an olefin polymer having a good particle size distribution is difficult to obtain unless the magnesium halide component is subjected to a special operation such as spray granulation. Furthermore, with the methods disclosed specifically by these prior art references, an attempt to obtain a polymer having a high melt index does not easily lead to a sufficiently high stereospecificity of the polymer.

There is known another prior suggestion of producing a solid titanium catalyst component containing magnesium, titanium, halogen and an electron donor and derived from a magnesium-containing solid carrier obtained by contacting a magnesium compound in the liquid state with a precipitant. For example, a solid titanium catalyst component containing magnesium, titanium, halogen and an electron donor and derived from a magnesium compound in the liquid state, a titanium compound in the liquid state and the electron donor is disclosed in Japanese Laid-Open Patent Publication No. 40293/79 (published Mar. 29, 1979). This prior method utilizes the fact that a compound of the formula Ti(OR$^2$)$_4$ wherein R$^2$ is C$_1$–C$_{10}$ alkyl, aryl or cycloalkyl well dissolves a compound of the formula Mg(OR$^1$)$_{2-n}$X$_n$ wherein R$^1$ is C$_1$–C$_{10}$ alkyl, aryl or cycloalkyl, X is halogen, and $0 < n \leq 2$ and an electron donor to form a homogeneous solution. The solid titanium catalyst component is prepared in accordance with this prior method by forming a homogeneous solution of the aforesaid three compound, subjecting the solution to a precipitating treatment to form a solid composition containing magnesium, titanium, halogen and the electron donor, and contacting the resulting solid composition with a titanium compound in the liquid state. According to this method, the precipitating treatment can be performed by lowering the temperature of the solution; or by adding to the solution a nonsolvent, as a percipitant for a solid component to be precipitated; or by adding a precipitant such as a halogen compound of silicon or tin to the solution. All the working examples in this prior Patent Publication show an embodiment of adding the precipitating agent. It is still desired to improve the stereospecificity of a polymer obtained by polymerizing an olefin using the solid titanium catalyst component prepared by this prior method, and also the catalytic activity of the catalyst component obtained by this method. When an attempt is made to produce a polymer of a high melt index by polymerizing an olefin in the presence of a molecular weight controlling agent such as hydrogen using the solid titanium catalyst component obtained by this prior method, the stereospecificity of the polymer and the catalytic activity of the catalyst component are reduced to unnegligible degrees. The prior suggestions also suffer from the disadvantage that sulubilization of the magnesium compound with Ti(OR$_2$)$^4$ is essential, and at least two kinds of titanium compound should be used to obtain the titanium catalyst component.

Still another prior suggestion was made in Japanese Laid-Open Patent Publication No. 66392/79 (published May 28, 1979) which discloses the utilization of a solid titanium catalyst component obtained by reacting a hydrocarbon-soluble organomagnesium compound which has reducing ability and a titanium compound and/or a vanadium compound containing at least one halogen atom. According to this suggestion, the solid titanium catalyst component can be formed by directly reacting the organomagnesium compound in the liquid state with a titanium compound in the liquid state. Further improvement is desired in regard to this solid titanium catalyst component as in the prior suggestion described above. This prior method has also been found to suffer from the defect that in polymerization in the presence of a molecular weight controlling agent, there is a substantial reduction in stereospecificity and catalytic activity.

Japanese Laid-Open Patent Publication No. 131887/75 (published Oct. 18, 1975) discloses a method for preparing a solid titanium catalyst component containing magnesium, titanium, halogen and an electron donor which is characterized by coprecipitation from a solution of a titanium tetrahalide/ether complex and a magnesium halide/ether complex. The use of the resulting solid titanium catalyst component, however, has the same disadvantages as in the other prior suggestions discussed hereinabove, and further improvement is desired.

The present inventors have made investigations about the development of an excellent catalyst for polymerization of olefins which can achieve high stereospecificity and catalytic activity that do not substantially decrease in the presence of a molecular weight controlling agent, and can be used without the disadvantages and difficulties that are encountered by the prior techniques in using a solid titanium catalyst component containing magnesium, titanium, halogen and an electron donor.

As a result, the present inventors have found that a solid titanium catalyst component (A) meeting the aforesaid requirement (II) and obtained by reacting the titanium compound (iv) in the liquid state with a magnesium-containing solid carrier formed by contacting the magnesium compound (i) in the liquid state with the precipitant (ii) other than a titanium compound in the presence or absence of the electron donor (iii) having no active hydrogen, with the electron donor (iii) having no active hydrogen being used at least once, can achieve the further improvements desired in the prior art and thus overcome the troubles associated with the prior process.

It is an object of this invention therefore to provide an improved process for producing a polymer or copolymer of an olefin.

Another object of this invention is to provide a solid titanium catalyst component for use in the afore-said improved process, and a process for producing such a catalyst component.

These and other objects and advantages of this invention will become more apparent from the following description.

This solid titanium catalyst component (A) used in this invention is the reaction product obtained by a procedure which meets the aforesaid requirements (I) and (II).

The magnesium compound having no reducing ability, which is used in the preparation of the solid titanium catalyst component, i.e. a magnesium compound free from a magnesium-carbon linkage or a magnesium-hydrogen linkage, may be the one derived from a magnesium compound having reducing ability.

Examples of the magnesium compound having no reducing ability are magnesium halides such as magnesium chloride, magnesium bromide, magnesium iodide and magnesium fluoride; alkoxy magnesium halides preferably with the alkoxy having 1 to 20 carbon atoms such as methoxy magnesium chloride, ethoxy magnesium chloride, isopropoxy magnesium chloride, butoxy magnesium chloride, and octoxy magnesium chloride; aryloxy magnesium halides preferably with the aryloxy group having 6 to 30 carbon atoms such as phenoxy magnesium chloride and methylphenoxy magnesium chloride; alkoxy magnesiums preferably with the alkoxy group having 1 to 20 carbon atoms such as ethoxy magnesium, isopropoxy magnesium, butoxy magnesium and octoxy magnesium; aryloxy magnesiums preferably with the aryloxy group having 6 to 30 carbon atoms such as phenoxy magnesium and dimethylphenoxy magnesium; and magnesium salts of carboxylic acids such as magnesium laurate and magnesium stearate. The magnesium compounds may be in the form of complexes with other metals or mixtures with other metal compounds. Or two or more of these magnesium compounds may be used as mixtures. Preferred magnesium compounds are the halogen-containing magnesium compounds, above all magnesium chloride, alkoxy magnesium chlorides, preferably those having $C_1$-$C_{10}$ alkoxy, and aryloxy magnesium chlorides, preferably those having $C_6$-$C_{20}$ aryloxy.

The magnesium compound (i) in the liquid state having no reducing ability and not containing tetraalkoxy-, tetracycloalkoxy- or tetraaryloxy-titanium compound may be a liquid magnesium compound or a solution of a magnesium compound in a hydrocarbon solvent. Or it can be formed by contacting the aforesaid magnesium compound with at least one electron donor selected from the group consisting of alcohols, organic carboxylic acids, aldehydes, amines and mixtures thereof in the presence or absence of a hydrocarbon solvent capable of dissolving the magnesium compound. The embodiment of contacting with the specified electron donor is preferred.

Examples of the hydrocarbon solvent used for this purpose include aliphatic hydrocarbons such as pentane, hexane, heptane, octane, decane, dodecane, tetradecane and kerosene; alicyclic hydrocarbons such as cyclopentane, methylcyclopentane, cyclohexane, methylcyclohexane, cyclooctane and cyclohexane; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

A solution of the magnesium compound in such a hydrocarbon solvent can be prepared, for example, by simply mixing both; mixing both and heating the mixture; or by mixing them in the presence of an electron donor soluble in the magnesium compound which is selected from the group consisting of alcohols, aldehydes, amines, carboxylic acids and mixtures thereof or a mixture of it with another electron donor (to be described), and optionally heating the mixture. The method of preparation, however, differs dependng upon the types of the magnesium compound and the solvent. In the case of dissolving a halogen-containing magnesium compound in a hydrocarbon solvent using an alcohol as an electron donor the alcohol may be used in an amount of at least about 0.5 mole, preferably about 0.5 to about 20 moles, especially preferably about 1 to about 12 moles, per mole of the halogen-containing magnesium compound, although the amount differs depending upon the type or amount of the hydrocarbon solvent, the type of the magnesium compound, etc. When an aliphatic hydrocarbon or an alicyclic hydrocarbon is used as the hydrocarbon solvent, alcohols are used in the aforesaid amount, but if among these alcohols, alcohols having at least 6 carbon atoms are used in an amount of at least 0.5 mole, preferably at least 1.0 moles, per mole of the halogen-containing magnesium compound, the halogen-containing magnesium compound can be solubilized, and a catalyst component having high catalyst activity can be obtained, by using the alcohols in a small total amount. Thus, this embodiment is preferred. If in this case only alcohols having 5 or less carbon atoms are used, the total amount of the alcohols should be at least about 15 moles per mole of the halogen-containing magnesium compound, and the resulting catalyst component has lower catalytic activity than in the case of using the alcohols in the aforesaid manner. On the other hand, if an aromatic hydrocarbon is used as the hydrocarbon solvent, the halogen-containing magnesium compound can be solubilized by using the alcohols in an amount of about 1 to about 20 moles, preferably about 1.5 to about 12 moles, irrespective of the types of the alcohols.

Contacting of the halogen-containing magnesium compound with the alcohol is preferably carried out in a hydrocarbon medium. The contacting is carried out at room temperature or at higher temperatures, for example at least about 65° C., preferably about 80° to 300° C., more preferably about 100° to about 200° C., depending upon the types of the magnesium compound and alcohol, for a period of about 15 minutes to about 5 hours, preferably about 30 minutes to about 2 hours.

Examples of preferred alcohols having at least 6 carbon atoms, preferably 6 to 20 carbon atoms, as the electron donor used to form (i) the magnesium compound in the liquid state include aliphatic alcohols such as 2-methylpentanol, 2-ethylbutanol, n-heptanol, n-octanol, 2-ethylhexanol, decanol, dodecanol, tetradecyl alcohol, undecenol, oleyl alcohol and stearyl alcohol; alicyclic alcohols such as cyclohexanol and methyl cyclohexanol; and aromatic alcohols such as benzyl alcohol, methylbenzyl alcohol, isopropylbenzyl alcohol, α-methylbenzyl alcohol and α,α-dimethylbenzyl alcohol. Other examples include alcohols having not more than 5 carbon atoms such as methanol, ethanol, propanol, butanol, ethylene glycol and methyl carbitol.

Suitable carboxylic acids used for the formation of the magnesium compound (i) are organic carboxylic acids having at least 7, preferably 7 to 20, carbon atoms, such as caprylic acid, 2-ethylhexanoic acid, undecylenic acid, undecanoic acid, nonylic acid and octanoic acid.

Suitable aldehydes for use in the formation of the magnesium compound (i) are aldehydes having at least 7, preferably 7 to 18, carbon atoms, such as capric aldehyde, 2-ethylhexyl aldehyde, caprylaldehyde and undecylic aldehyde. Suitable amines for use in preparing the magnesium compound (i) are amines having at least 6, preferably 6 to 18, carbon atoms, such as heptylamine, octylamine, nonylamine, decylamine, laurylamine, undecylamine and 2-ethylhexylamine.

Suitable amounts of these carboxylic acids, aldehydes or amines and suitable temperatures of use are substantially the same as those described hereinabove with regard to the alcohols. Alcohols are especially preferred as the electron donor for use in forming the magnesium compound (i) in the liquid state.

Examples of other electron donors which can be used together with the aforesaid magnesium compound-soluble electron donors include organic acid esters, organic acid halides, organic acid anhydrides, ethers, ketones, tertiary amines, phosphite esters, phosphate esters, phosphoric amide, carboxylic amides and nitriles. Specific examples are those exemplified hereinbelow as electron donors having no active hydrogen used in preparing the catalyst of this invention.

The magnesium compound (i) in the liquid state can also be prepared by using magnesium metal or a magnesium compound convertible to the aforesaid magnesium compound, and dissolving it in the aforesaid donor or donors and the hydrocarbon solvent while converting it into the aforesaid magnesium compound. For example, this can be achieved by dissolving or suspending a magnesium compound containing alkyl, alkoxy, aryloxy, acyl, amino, hydroxyl, etc., magnesium oxide, magnesium metal, etc. in a hydrocarbon solvent in which the afore-said alcohol, amine, aldehyde or carboxylic acid is dissolved, and converting it into a halogen-containing magnesium compound having no reducing ability while halogenating it with a halogenating agent such as a hydrogen halide, a silicon halide and halogen. Alternatively, it is possible to treat a magnesium compound having reducing ability, such as Grignard reagents, dialkyl magnesiums, magnesium halides and complexes of these with other organometallic compounds, e.g. $M_\alpha Mg_\beta\text{-}R^1_p R^2_q X_r Y_s$ [wherein M represents aluminum, zinc, boron or beryllium; $R^1$ and $R^2$ are hydrocarbon groups; X and Y represent groups of the formulae $OR^3$, $OSiR^4R^5R^6$, $NR^7R^8$ and $SR^9$; $R^3$, $R^4$, $R^5$, $R^6$, $R^7$ and $R^8$ are hydrogen or hydrocarbon groups; $R^9$ is a hydrocarbon group; $\alpha, \beta > 0$; p, q, r, s $\geq 0$; m is the atomic valency of M; provided that $\beta/\alpha \geq 0.5$, $p+q+r+s=m\alpha+2\beta$, and $0 \leq (r+s)/(\alpha+\beta) < 1.0$; the hydrocarbon group above is preferably selected from alkyl groups having 1 to 10 carbon atoms, or aryl groups having 6 to 20 carbon atoms] with a compound capable of destroying the reducing ability of the magnesium compound, such as an alcohol, ketone, ester, ether, acid halide, silanol or siloxane to convert it into a magnesium compound having no reducing ability which can be used in the present invention.

The use of the magnesium having no reducing ability (i) is essential in the present invention, but this does not preclude the use of a magnesium compound having reducing ability in combination. In many cases, it is not desirable to use a large amount of the compound having reducing ability together.

A solution of the magnesium compound (i) in the liquid state in an electron donor may also be used. Electron donors suitable for this purpose are selected from alcohols, amines, aldehydes, carboxylic acids and the mixtures thereof which are exemplified hereinabove. Alcohols are especially preferred. The amounts of the ingredients and the dissolving temperature used for preparing such a solution are the same as in the case of forming the magnesium compound having no reducing ability (i) by dissolving a magnesium compound in a hydrocarbon solvent while contacting it with an electron donor selected from the group consisting of alcohols, organic carboxylic acids, aldehydes, amines and mixtures thereof.

Generally, however, the dissolving temperature is preferably maintained at a relatively high level, and the reactants are preferably dissolved in a hydrocarbon solvent.

The precipitant (ii) used in the process of this invention to form the magnesium-containing solid carrier by contacting it with the magnesium compound (i) in the liquid state having no reducing ability may be any precipitants other than titanium compounds which react with the magnesium compound (i) and/or with the aforesaid electron donor utilized in forming the aforesaid magnesium compound in the liquid state to produce the magnesium-containing solid carrier.

Thus, the precipitant (ii) may, for example, be an organometallic compound of a metal selected from the group consisting of metals of Groups I to III of the periodic table or a silicon compound having at least one member selected from the group consisting of halogen, hydrogen and hydrocarbon groups directly bonded to the silicon atom. Two or more such organometallic compounds or silicon compounds or mixtures of the organometallic compound and the silicon compound may be used. A halogen compound of a metal selected from the group consisting of germanium, tin, phosphorus, sulfur etc. may also be used. The silicon compounds are preferred.

The organometallic compound of a metal of Groups I to III as the precipitant (ii) may, for example, be those which can be used also as component (B) of the catalyst used in the process of this invention. Preferred silicon compounds are compounds of general formula $R^1R^2R^3R^4Si$ wherein $R^1$, $R^2$, $R^3$ and $R^4$ are identical or different and each represents a hydrogen atom, a hydrocarbon group, an alkoxy group, an aryloxy group or a halogen atom. Examples of preferred hydrocarbon groups in the above general formula are alkyl groups having 1 to 20 carbon atoms, preferably 1 to 10 carbon atoms.

Examples of the silicon compound include silicon tetrahalides, tetralkyl silicons, silicon alkylhalides, silicon alkylhydrides, silicon alkoxyhalides, silicon aryloxyhalides, and alkylalkoxy silicons. Specific examples are $SiCl_4$, $CH_3SiCl_3$, $(CH_3)_2SiCl$, $(CH_3)SiCl$, $(CH_3O)SiCl_3$, $(C_2H_5O)SiCl_3$, $(C_2H_5O)_2SiCl_2$, $(C_2H_5O)_3SiCl$, $(C_6H_5O)SiCl_3$ and $(CH_3)_3(C_2H_5O)Si$. Other examples of the silicon compound include polysiloxanes having halogen, hydrocarbon group or hydrogen directly bonded to silicon. These compounds can be used as diluted in hydrocarbon solvents.

The contacting of the magnesium compound (i) in the liquid state having no reducing ability with the precipitant (ii) can be performed in the presence or absence of the electron donor (iii) having no active hydrogen.

The electron donor (iii) having no active hydrogen which is used in preparing the solid titanium catalyst component (A) in this invention may, for example, include organic acid esters, organic acid halides, organic acid anhydrides, ethers, aldehydes, ketones, tertiary amines, phosphite esters, phosphate esters, phosphoric amide, carboxylic amides, and nitriles. Specific examples are ketones having 3 to 15 carbon atoms such as acetone, methyl ethyl ketone, methyl isobutyl ketone, acetophenone, benzophenone, cyclohexanone and benzoquinone; aldehydes having 2 to 15 carbon atoms such as acetaldehyde, propionaldehyde, octalaldehyde, benzaldehyde, tolualdehyde and naphthoaldehyde; organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, methyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl t-butylbenzoate, methyl anisate, ethyl anisate, ethyl ethoxybenzoate, γ-butyrolactone, δ-valerolactone, cumarine, phthalide and ethylene carbonate; inorganic acid esters, for example, alkylalkoxysilanes such as ethyltriethoxysilane; acid halides having 2 to 15 carbon atoms such as acetyl chloride, benzoyl chloride, toluoyl chloride and anisoyl chloride; ethers having 2 to 20 carbon atoms such as methyl ether, ethyl ether, isopropyl ether, butyl ether, amyl ether, tetrahydrofuran, anisole and diphenyl ether; acid amides such as acetic N,N-dimethylamide, benzoic N,N-diethylamide, and toluic N,N-dimethylamide; tertiary amines such as trimethylamine, triethylamine, tributyl amine, tribenzylamine and tetramethylethylenediamine; and nitriles such as acetonitrile, benzonitrile and tolunitrile.

These electron donors may be used in combination with each other. Among these electron donors, the organic acid esters, especially aromatic carboxylic acid esters, are preferred. It is not always necessary to use such an electron donor as a starting material. It may be formed in the course of preparing the solid titanium catalyst component (A), or it may be used in the form of an adduct or complex with another compound.

Examples of the titanium compound (iv) in the liquid state to be reacted with the magnesium containing solid carrier formed from the magnesium compound (i) and the precipitant (ii) in the presence or absence of the electron donor (iii) in preparing the solid titanium catalyst component (A) are tetravalent titanium compounds of the formula $Ti(OR)_gX_{4-g}$ wherein R represents a hydrocarbon group, X represents a halogen atom and g is a number represented by $0 \leq g < 4$, preferably $0 \leq g \leq 3.5$, more preferably $0 \leq g \leq 2$. Examples of the group R are alkyl groups having 1 to 10 carbon atoms.

Examples of the titanium compounds (iv) are titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(On-C_4H_9)Cl_3$, $Ti(OC_2H_5)Br_3$ and $Ti(Oiso-C_4H_9)Br_3$; alkoxy titanium dihalides such as $Ti(OCH_3)_2Cl_2$, $Ti(OC_2H_5)_2Cl_2$, $Ti(On-C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(On-C_4H_9)_3Cl$ and $Ti(OC_2H_5)_3Br$; and mixture of these with other compounds such as aluminum compounds and silicon compounds. Of these, the halogen-containing titanium compounds, especially titanium tetrahalides, specifically titanium tetrachloride, are preferred.

The titanium compound (iv) in the liquid state may be any single liquid titanium compound of the type exemplified hereinabove, or a mixture of such titanium compounds, or a solution of a titanium compound such a titanium compound in a solvent such as a hydrocarbon.

As specified in the requirements (I) and (II), the solid titanium catalyst component (A) is prepared by using the titanium compound (iv) in the liquid state and the magnesium-containing solid carrier formed by contacting the magnesium compound (i) in the liquid state having no reducing ability and not containing a tetraalkoxy-tetracycloalkoxy- or tetraaryloxy-titanium compound with the precipitant (ii) other than a titanium compound in the presence or absence of the electron donor (iii) having no active hydrogen. Specifically, it is formed by reacting the titanium compound (iv) in the liquid state with the magnesium-containing solid carrier pre-treated or not pre-treated with the electron donor (iii) having no active hydrogen, in the presence or absence of the electron donor (iii) having no active hydrogen. In the course of formation of the catalyst component (A), the electron donor (iii) having no active hydrogen should be used at least once. The electron donor (iii) to be used at least one may be caused to be present during the contacting of the magnesium compound (i) with the precipitant (ii). Or the electron donor (iii) may be first contacted with the magnesium-containing solid carrier formed from the magnesium compound (i) and the precipitant (ii) and then the product may be reacted with the titanium compound (iv). Alternatively, the electron donor (iii) may be caused to be present during the reaction of the magnesium-containing solid carrier with the titanium compound (iv). According to still another embodiment, the electron donor (iii) may be pre-mixed with the magnesium compound (i) in the liquid state or the precipitant (ii), or with both. In any case, the electron donor is used at least once in the requirements (I) and (II).

To include the electron donor (iii) into the magnesium compound (iii) in the liquid state, it is possible to employ a method comprising simply mixing it with a solution of the magnesium compound, or a method which comprises adding it to a solvent and then preparing a solution of the magnesium compound therein in the manner already described hereinabove, or a method which comprises contacting a mixture of the magnesium compound and the electron donor with a solvent to form a solution.

For example, it is possible to use a product obtained by adding an excess of the electron donor not containing active hydrogen to a hydrocarbon solution of an alkyl magnesium compound having reducing ability to destroy its reducing ability, or adding a mixture of an electron donor having active hydrogen and the electron donor having no active hydrogen to the aforesaid hydrocarbon solution to destroy the reducing ability of the magnesium compound, and solubilizing the resulting product in a hydrocarbon solvent in the manner stated hereinabove. It is also possible to add a compound capable of being converted to the electron donor (iii) and forming the electron donor (iii) in situ.

The amount of the electron donor (iii) is preferably about 0.01 to about 10 moles, more preferably about 0.01 to amount 1 mole, especially preferably about 0.1 to about 1.0 mole, per mole of the magnesium compound. Even when the electron donor is used in a large amount, a solid catalyst component of high performance may be obtained if the amount of the titanium compound, for example, is controlled. Nevertheless, the aforesaid amounts are suitable.

The amount of the precipitant (ii) varies depending upon the type of the magnesium compound, the type of the precipitant (ii), the means of solubilizing the magnesium compound, etc. When the halogen-containing magnesium compound is rendered liquid by using an electron donor such as an alcohol, it is preferred to use the precipitant (ii) in an amount of about 0.1 to about 100 moles, especially about 0.3 to about 20 moles, per mole of the electron donor.

The magnesium compound (i) in the liquid state having no reducing ability may be contacted with the precipitant (ii) in accordance with any embodiments of mixing both of these compounds. Depending upon the contacting conditions, the resulting solid catalyst component may differ in shape or size. A preferred method comprises mixing the precipitant (ii) and the magnesium compound (i) in the liquid state at a temperature low enough to inhibit rapid formation of a solid product upon contacting, and gradually forming the mixture into a solid product by, for example, raising the temperature. This method can afford a solid titanium catalyst component (A) having a relatively large particle diameter and a narrow particle size distribution. A product with a better particle size distribution can be obtained by performing the above method in the presence of a suitable amount of the electron donor (iii) having no active hydrogen.

The contacting temperature used in the contacting procedure may, for example, be about $-70°$ C. to $+200°$ C. The temperatures of the compounds (i) and (ii) to be contacted may differ from each other. Generally, it is preferred in many cases to employ a method which does not use too high a temperature during mixing of the two, if it is desired to obtain a solid catalyst component of high performance having a good particle size distribution. For example, the temperature is preferably about −70° C. to about +50° C. If, on the other hand, the contacting temperature is too low, a solid material sometimes does not form. In such a case, it is advisable to perform the reaction after elevating the temperature to, for example, about 50° to about 150° C., or to perform the contacting for a long period of time in order to precipitate a solid reaction product.

The reaction of the titanium compound (iv) in the liquid state with the magnesium-containing carrier formed in the aforesaid manner from the magnesium compound (i) and the precipitant (ii) is carried out under conditions which meet the requirement (II).

When the electron donor (iii) having no active hydrogen is to be contacted with the magnesium-containing solid carrier before reaction with the titanium compound (iv) in the liquid state, the electron donor (iii) is added to the suspension of the magnesium-containing solid carrier obtained by the aforesaid reaction or a suspension in a hydrocarbon solvent of the magnesium-containing solid carrier separated from the reaction product, and they are contacted at a temperature of, for example, about 0° to about 150° C.

The titanium compound (iv) in the liquid state under the contacting conditions may be a liquid titanium compound or a hydrocarbon solution of a titanium compound. The electron donor (iii) or a compound convertible to the electron donor (iii) during the reaction may be included in the titanium compound (iv) in the liquid state. The amount of the titanium compound (iv) varies depending upon the type of the titanium compound, the contacting conditions, and the amounts used of the electron donor (iii) and other compounds. Preferably, it is at least 1 mole, usually about 5 to about 200 moles, especially about 10 to about 100 moles, per mole of the magnesium compound (based on metallic magnesium) in the magnesium-containing solid carrier. The preferred amount of the titanium compound (iv) per mole of the electron donor (iii) (the total amount of the electron donors present in the magnesium-containing solid carrier and that used in reaction with the titanium compound (iv)) is more than about 1 mole, especially more than about 5 moles. The reaction of the titanium compound (iv) in the liquid state with the magnesium-containing solid carrier is carried out at a temperature of preferably about 30° to about 200° C., especially preferably about 50° to about 150° C. The resulting product may be washed at least once with a liquid titanium compound, preferably titanium tetrachloride, at a temperature of preferably about 30° to about 200° C., especially preferably about 50° to about 150° C.

Preferably, the solid titanium catalyst component (A) obtained by the method described hereinabove is used in polymerization after it has been well washed with a hydrocarbon. The resulting solid titanium catalyst component (A) has a magnesium/titanium atomic ratio of preferably from about 2 to about 100, more preferably from about 4 to about 50, especially preferably from about 5 to about 30, a halogen/titanium atomic ratio of preferably from about 4 to about 100, more preferably from about 5 to about 90, especially preferably from about 8 to about 50, and an electron donor/titanium mole ratio of preferably from about 0.01 to about 100, more preferably from about 0.2 to about 10, especially preferably from about 0.4 to about 6.

The solid titanium catalyst component (A) may have a specific surface area of, for example, at least about 10 $m^2/g$, preferably about 100 to about 1000 $m^2/g$.

In accordance with this invention, olefins are polymerized or copolymerized in the presence of a catalyst composed of the resulting solid titanium catalyst component (A) and an organometallic compound (B) of a metal of Groups I to III of the periodic table.

Examples of the organometallic compounds of metals of Groups I to III of the periodic table are given below.

(1) Organoaluminum compounds having at least one Al-C linkage in the molecule, for example, organoaluminum compounds of the general formula

$$R^1_m Al(OR^2)_n H_p X_q$$

wherein $R^1$ and $R^2$ are identical or different and represent a hydrocarbon group containing 1 to 15 carbon atoms, preferably 1 to 4 carbon atoms; X represents a halogen atom; m is a number represented by $0 < m \leq 3$; n is a number represented by $0 \leq n < 3$; p is a number represented by $0 \leq p < 3$; q is a number represented by $0 \leq q < 3$; and $m+n+p+q=3$.

Examples of the hydrocarbon groups in the above formula are alkyl groups.

(2) Alkylated complexes of metals of Group I and aluminum which are represented by the general formula $$M^1 Al R^1_4$$

wherein $M^1$ is Li, Na or K, and $R^1$ is as defined above.

(3) Dialkyl compounds of metals of Group II which are represented by the general formula $$R^1 R^2 M^2$$

wherein $R^1$ and $R^2$ are as defined above, and $M^2$ represents Mg, Zn or Cd.

Examples of the organoaluminum compounds (1) above are those of the following general formulae.

$$R^1_m Al(OR^2)_{3-m}$$

wherein $R^1$ and $R^2$ are as defined hereinabove, and m is preferably a number represented by $1.5 \leq m \leq 3$.

$$R^1_m Al X_{3-m}$$

wherein $R^1$ is as defined above, X is halogen, and m is preferably a number represented by $0 < m < 3$.

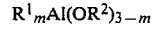
$$R^1_m Al H_{3-m}$$

wherein $R^1$ is as defined above, and m is preferably a number represented by $2 \leq m < 3$.

$$R^1_m Al(OR^2)_n X_q$$

wherein $R^1$ and $R^2$ are as defined above, X is halogen, $0 < m \leq 3$, $0 \leq n < 3$, $0 \leq q < 3$, and $m+n+q=3$.

Specific examples of the aluminum compounds (1) include trialkyl aluminums such as triethyl aluminum and tributyl aluminum; trialkenyl aluminum such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride and propyl aluminum dichloride; dialkyl aluminum hydrides such as diethyl aluminum hydride and dibutyl aluminum hydride; partially hydrogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

$LiAl(C_2H_5)_4$ and $LiAl(C_7H_{15})_4$ are cited as examples of the compounds (2) above, and diethyl lead and diethyl magnesium are cited as examples of the compound (3). Alkyl magnesium halides such as ethyl magnesium chloride can also be used. Of the above compounds, trialkyl aluminums, alkyl aluminum halides, and mixtures of these are preferred.

According to the process of this invention, olefins are polymerized with or without up to about 5 mole% of a diolefin in the presence of a catalyst composed of (A) the solid titanium catalyst component meeting the requirements (I) and (II), and (B) the organometallic compound.

Olefins having 2 to 8 carbon atoms are preferred. Specific examples include ethylene, propylene, 1-butene, 4-methyl-1-pentene and 1-octene. Examples of the diolefins include non-conjugated diolefins such as dicyclopentadiene, 1,4-hexadiene and ethylidenenorbornene.

The olefins may be homopolymerized, random copolymerized or blocked copolymerized. In copolymerizations, diolefins such as conjugated or non-conjugated dienes can be chosen as a comonomer. For example, in the copolymerization of propylene, it is possible to polymerize propylene until a homopolymer of propylene is obtained in an amount of about 60 to about 90% of the total composition, and subsequently polymerizing ethylene or a mixture of propylene and ethylene. Or a mixture of propylene and ethylene may be polymerized in order to obtain a copolymer containing not more than about 5% by weight of ethylene.

The polymerization can be performed either in the liquid phase or in the gaseous phase. In the liquid-phase polymerization, an inert hydrocarbon solvent such as hexane, heptane or kerosene may be used as a reaction medium, but the olefin itself may also be used as the reaction medium. In the liquid-phase polymerization, about 0.0001 to about 1 millimole calculated as titanium atom in component (A) of component (A) per liter of liquid phase, and about 1 to about 2000 moles, preferably about 5 to about 500 moles, of the component (B) as metal atom, per mole of the titanium atom in the component (A) may be used. In the gaseous-phase polymerization, about 0.001 to about 1.0 millimole calculated as titanium atom in component (A) of component (A) per liter of vapor phase, and about 1 to about 2000 moles, preferably about 5 to about 500 moles, of the component (B) as metal atom, per mole of the titanium atom in the component (A) may be used.

In polymerization, a molecular weight controlling agent such as hydrogen may be used. To control the stereospecificity of an alpha-olefin having at least 3 carbon atoms, the polymerization may be carried out in the copresence of an electron donor such as ethers, ethylene glycol derivatives, amines, amides, sulfur-containing compounds, nitriles, esters, carboxylic acids, acid amides, oxy acid, keto acids, acid anhydrides, acid halides and amino acids. Organic esters, above all aromatic carboxylic acid esters, are preferred as the electron donor. Such an aromatic carboxylic acid ester is selected from those used in the preparation of the solid catalyst component (A). Benzoic acid esters and nuclearly substituted benzoic acid esters are especially preferred. Specific examples of the nuclearly substituted benzoic acid esters are toluates, t-butylbenzoates, anisates, phthalates, diterephthalates, hydroxybenzoates and aminobenzoates. Alkyl esters, or example $C_1$–$C_8$ alkyl esters, are preferred. Methyl p-toluate and ethyl p-toluate are most preferred.

The electron donor may be used in the form of an adduct with the aforesaid organometallic compound, or with other compounds such as Lewis acids (e.g., $AlCl_3$). The effective amount of the electron donor is usually about 0.001 to about 10 moles, preferably about 0.01 to about 2 moles, more preferably about 0.1 to about 1 mole, per mole of the organometallic compound.

In the gaseous phase polymerization, a fluidized bed, an agitated fluidized bed, etc. are used, and the catalyst component (A) as a solid or in a form diluted with hexane, olefin, etc. and the component (B) as such or in a form diluted with hexane, olefin, etc. are fed into a polymerization vessel, and if desired, hydrogen in gaseous form is fed into the polymerization vessel to perform polymerization therein.

The polymerization of olefins is carried out preferably at a temperature of about 20° to about 200° C., more preferably about 50° to about 180° C. and a pressure of from atmospheric pressure to about 100 kg/cm$^2$, preferably about 2 to about 50 kg/cm$^2$. The polymerization may be performed batchwise, semi-continuously, or continuously. It is also possible to perform the polymerization in two or more stages having different reaction conditions.

In particular, when applied to stereospecific polymerization of alpha-olefins having at least 3 carbon atoms, the process of this invention can afford polymers having a high stereospecificity index with a high catalytic efficiency. In polymerizing olefins using a similar solid catalyst component previously suggested, an attempt to obtain a polymer of a high melt index by using hydrogen frequently results in a tendency of unnegligibly decreasing the stereospecificity of the polymer, but the process of this invention can reduce this tendency. As the catalyst component in accordance with this invention is highly active, the amount of the polymer yielded per unit weight of the solid titanium catalyst component is larger than that in the prior art when obtaining a polymer of the same stereospecific index. Accordingly, the amount of the catalyst residue in the polymer, especially its halogen content, can be reduced, and the operation of removing the catalyst can be omitted. Moreover, the tendency toward corrosion of molds in molding the resulting polymer can be markedly inhibited.

Furthermore, by slurry polymerization or gaseous phase polymerization, too, a polymer in the form of granules or nearly spherical particles can be formed. Such a granular or spherical polymer has good flowability, and in some applications, it can be used without pelletization.

The following Examples illustrate the present invention more specifically.

EXAMPLE 1

Anhydrous magnesium chloride (4.76 g), 25 ml of decane, 23.2 ml of 2-ethylhexyl alcohol and 2.3 ml of ethyl benzoate were reacted at 120° C. for 2 hours to form a uniform solution. The solution was maintained at 0° C. with stirring, and a mixture of 11.3 ml of ethyl aluminum sesquichloride and 25 ml of decane was added dropwise over 1 hour. After the addition, the mixture was heated to 40° C., and maintained at this temperature for 1 hour. By this procedure, the magnesium compound in the liquid state changed to a solid substance. The above suspension was allowed to stand, and the supernatant liquid was removed. The residue was again suspended in decane. This procedure was repeated three times, and finally 25 ml of decane was added. The resulting suspension was added to 100 ml of titanium tetrachloride at room temperature over 1 hour with stirring. Then, the mixture was heated to 80° C., and maintained at this temperature for 2 hours with stirring. The solid portion was collected by filtration, and again suspended in 100 ml of titanium tetrachloride and reacted at 90° C. for 2 hours. The solid substance was collected by filtration, and washed with purified hexane sufficiently until no free titanium compound was detected in the washing. The washed product was dried to obtain a catalyst component (A). This catalyst component contained, as atoms, 3.2% by weight of titanium, 57% by weight of chlorine, 16% by weight of magnesium and 9.8% by weight of ethyl benzoate.

Polymerization

A 2-liter autoclave was charged with 750 ml of purified hexane, and in a propylene atmosphere at room temperature, 1.67 millimoles of triisobutyl aluminum, 0.833 millimole of ethyl aluminum sesquichloride and 0.5 millimole of methyl p-toluate were fed into the autoclave. Five minutes later, 0.015 millimole, calculated as titanium atom, of the catalyst component (A) was introduced into the autoclave. Furthermore, 500 ml of hydrogen was introduced, and propylene was polymerized at 70° C. for 2 hours. During the polymerization, the pressure was maintained at 7 kg/cm$^2$.

After the polymerization, the slurry containing the resulting polymer was filtered to separate it into a white powdery polymer and a liquid layer. The amount of the white powdery polymer after drying was 275.1 g. The powdery polymer had a boiling n-heptane extraction residue of 96.8%, a melt index (MI) of 1.4 g/10 min. and an apparent density of 0.36 g/ml. Concentrating the liquid layer afforded 4.2 g of a solvent-soluble polymer. Accordingly, the catalyst activity was 18600 g of polypropylene/millimole of Ti, and the isotacticity index (I.I.) of the polymer was 95.3%.

EXAMPLE 2

Anhydrous magnesium chloride (4.76 g), 25 ml of decane and 23.2 ml of 2-ethylhexyl alcohol were reacted at 120° C. for 2 hours to form a uniform solution. The solution was added dropwise over 1 hour to 200 ml of silicon tetrachloride containing 2.3 ml of ethyl benzoate which was kept at 0° C. After the addition, the mixture was heated to 60° C. and maintained at this temperature for 12 hours. By this procedure, the magnesium compound changed to a solid substance. The above suspension was allowed to stand, and the supernatant liquid was removed. The residue was again suspended in decane. By repeating this procedure well, free silicon tetrachloride was removed. The resulting suspension was added to 100 ml of titanium tetrachloride, and the mixture was heated to 80° C. and maintained at this temperature for 2 hours with stirring. The mixture was worked up in the same way as in Example 1 to obtain a solid catalyst component (A). The resulting catalyst component (A) contained, as atoms, 2.9% by weight of titanium, 56% by weight of chlorine, 15% by weight of magnesium and 11.2% by weight of ethyl benzoate.

Polymerization

Propylene was polymerized by the same procedure as in Example 1. There was obtained 259.2 g of a white powdery polymer having a boiling n-heptane extraction residue of 96.4%, a melt index of 2.2 g/10 min. and an apparent density of 0.37 g/ml. Concentrating the liquid layer afforded 4.8 g of a solvent-soluble polymer. Accordingly, the catalyst activity was 17600 g of polypropylene/millimole of Ti, and the isotacticity index (I.I.) of the polymer was 94.6%.

Comparative Example 1

One mole of magnesium chloride was dissolved in 6 moles of ethanol at 70° C., and the solution was cooled to 20° C. A solid catalyst component (A) was prepared in the same way as in Example 2 except that the solid substance MgCl$_2$.6C$_2$H$_5$OH obtained by the above procedure was used. The resulting catalyst component (a) contained, as atoms, 1.4% by weight of titanium, 65% by weight of chlorine, 19% by weight of magnesium and 8.5% by weight of ethyl benzoate. Propylene was polymerized by the same operation as in Example 1. The catalyst activity was 17800 g of polypropylene/millimole of Ti, and the isotacticity index (I.I.) of the polymer was 90.0%.

EXAMPLES 3 TO 5

A catalyst component (A) was prepared in the same way as in Example 1 except that 23.2 ml of 2-ethylhexyl alcohol used in Example 1 was changed to each of the electron donors indicated in Table 1.

Using the resulting catalyst component (A), propylene was polymerized in the same way as in Example 1. The results are shown in Table 1.

TABLE 1

| | | Results of polymerization | | | |
|---|---|---|---|---|---|
| Example | Electron donor | Activity (g-PP/m mol Ti) | I.I. (%) | Apparent density (g/ml) | Melt index (g/10 min) |
| 3 | Oleyl alcohol (95 ml) | 16,400 | 93.8 | 0.37 | 1.6 |
| 4 | 2-Ethyl-1,3-hexanediol (44 g) | 17,800 | 94.2 | 0.36 | 2.3 |
| 5 | 10-Undecylenic acid (55 g) | 17,200 | 94.1 | 0.31 | 1.4 |

EXAMPLE 6

A catalyst component (A) was prepared in the same way as in Example 2 except that thionyl chloride was used instead of ethyl aluminum sesquichloride.

Using the resulting catalyst component (A), propylene was polymerized under the same conditions as in Example 1. The results are shown in Table 2.

EXAMPLE 7

A catalyst component (A) was prepared in the same way as in Example 1 except that 2.3 ml of ethyl benzoate was changed to 3.2 ml of ethyl p-tert-butylbenzoate.

Using the resulting catalyst component (A), propylene was polymerized under the same conditions as in Example 1. The results are shown in Table 2.

TABLE 2

| Example | Results of polymerization | | | |
|---|---|---|---|---|
| | Activity (g-PP/m mol Ti) | I.I. (%) | Apparent density (g/ml) | Melt index (g/10 min) |
| 6 | 15,400 | 93.7 | 0.35 | 3.2 |
| 7 | 17,900 | 94.7 | 0.37 | 1.2 |

What we claim is:

1. In a process for producing a polymer or a copolymer of an olefin having 2 to 8 carbon atoms which comprises polymerizing or copolymerizing the olefin or olefins with or without up to about 5 mole % of a diolefin at a temperature of about 20° to about 200° C. and a pressure of from atmospheric pressure to about 100 kg/cm² in the presence of a catalyst composed of (A) a solid titanium catalyst component containing magnesium, titanium, halogen and an electron donor and derived from a magnesium-containing solid carrier obtained by contacting a magnesium compound in the liquid state with a precipitant, and (B) an organoaluminum compound: the improvement wherein (I) said catalyst component (A) is a reaction product of (iv) a titanium compound in the liquid state having the formula $Ti(OR)_gX_{4-g}$ wherein R represents a hydrocarbon group, X represents a halogen atom and g is a number represented by $0 \leq g \leq 3.5$ and a magnesium-containing solid carrier formed by contacting (i) a magnesium compound in the liquid state having no reducing ability and not containing a tetraalkoxy-, tetracycloalkoxy- or tetraaryloxy-titanium compound, said magnesium compound being selected from the group consisting of a liquid magnesium compound, a hydrocarbon solvent solution of a magnesium compound and a magnesium compound in the liquid state obtained by contacting a magnesium compound with an electron donor selected from the group consisting of an alcohol having 6 to 20 carbon atoms, an organic carboxylic acid having 7 to 18 carbon atoms, an aldehyde having 7 to 18 carbon atoms and an amine having 6 to 18 carbon atoms, with (ii) a precipitant other than a titanium compound of an organometallic compound selected from the group consisting of (1) organoaluminum compounds of the general formula $R_m^1Al(OR^2)_nH_pX_q$ wherein $R^1$ and $R^2$ are identical or different and represent a hydrocarbon group containing 1 to 15 carbon atoms, X represents a halogen atom, m is a number represented by $0 < m \leq 3$, n is a number represented by $0 \leq n < 3$, p is a number represented by $0 \leq p < 3$, q is a number represented by $0 \leq q < 3$ and $m+n+p+q=3$, (2) alkylated complexes of metals of Group I and aluminum which are represented by the general formula $M^1AlR^1_4$ wherein $M^1$ is Li, Na or K, and $R^1$ is as defined above, and (3) dialkyl compounds of metals of Group II which are represented by the general formula $R^1R^2M^2$ wherein $R^1$ and $R^2$ are as defined above, and $M^2$ represents Mg, Zn or Cd or a silicon compound having at least one member selected from the group consisting of halogen, hydrogen and hydrocarbon groups directly bonded to the silicon atom, in the presence or absence of (iii) an electron donor having no active hydrogen, and (II) said reaction product is formed by reacting the titanium compound (iv) in the liquid state and the magnesium containing solid carrier pre-treated or not pre-treated with the electron donor (iii) having no active hydrogen and selected from the group consisting of an organic acid ester, an organic acid halide, an organic acid anhydride, an ether, a ketone, a tertiary amine, a carboxylic amide and nitrile in the presence or absence of the electron donor (iii) having no active hydrogen, the electron donor (iii) having no active hydrogen being used at least once in (I) and (II) above, and the reaction product being at least once again reacted with liquid titanium compound, the amount of the electron donor (iii) being about 0.01 to about 10 moles per mole of the magnesium compound (i), the amount of the titanium compound (iv) being 1 mole to about 200 moles per mole of the magnesium compound (based on magnesium atom) in the magnesium-containing solid carrier, and said catalyst component (A) having a magnesium/titanium atomic ratio of from about 2 to about 100, a halogen/titanium atomic ratio of from about 4 to about 100 and an electron donor/titanium mole ratio of from about 0.01 to about 100.

2. The process of claim 1 wherein said electron donor (iii) is pre-mixed with said magnesium compound (i) in the liquid state, or said precipitant (ii), or both.

3. The process of claim 1 wherein the amount of the metal atom in the organometallic compound (B) is about 1 to about 2000 moles per mole of the titanium atom in the solid titanium catalyst component (A).

4. The process of claim 1 wherein the polymerization or copolymerization is carried out in the presence of a catalyst formed by adding an electron donor to the components (A) and (B).

* * * * *